United States Patent [19]
Church et al.

[11] Patent Number: 6,023,037
[45] Date of Patent: Feb. 8, 2000

[54] ELECTRIC ARC WELDER AND PLASMA CUTTER

[75] Inventors: Larry L. Church, Jefferson; William T. Matthews, Chesterland, both of Ohio

[73] Assignee: Lincoln Global, Inc., Cleveland, Ohio

[21] Appl. No.: 09/186,087

[22] Filed: Nov. 5, 1998

[51] Int. Cl.[7] .................................................. B23K 9/00
[52] U.S. Cl. ............................ 219/121.39; 363/89
[58] Field of Search ................... 219/121.39; 363/65, 363/71, 89, 37, 53; 307/66, 43, 45, 71, 82

[56] References Cited

U.S. PATENT DOCUMENTS

| | | | |
|---|---|---|---|
| 4,447,695 | 5/1984 | Inoue | 219/69.13 |
| 4,564,742 | 1/1986 | Karlsson | 219/130.1 |
| 4,890,215 | 12/1989 | Freedman | 363/63 |
| 4,918,285 | 4/1990 | Thommes | 219/130.1 |
| 5,235,504 | 8/1993 | Sood | 363/53 |
| 5,331,212 | 7/1994 | Johnson-Williams et al. | 307/66 |
| 5,351,175 | 9/1994 | Blankenship | 363/16 |
| 5,430,635 | 7/1995 | Liu | 363/37 |
| 5,440,179 | 8/1995 | Severinsky | 307/66 |
| 5,786,992 | 7/1998 | Vinciarelli et al. | 363/89 |
| 5,875,104 | 2/1999 | Prager | 363/65 |
| 5,894,414 | 4/1999 | Jiang | 363/65 |

*Primary Examiner*—Teresa Walberg
*Assistant Examiner*—Quang Van
*Attorney, Agent, or Firm*—Vickers, Daniels & Young

[57] ABSTRACT

A single phase power supply module for electric arc welders and plasma arc cutters comprising: a single phase input stage; positive and negative output terminals; a full wave rectifier connected to the input stage for rectifying the single phase voltage at the input stage; a buck converter type power factor correcting circuit for controlling current flow from the input stage to the rectifier, which buck converter has an output capacitor regulated to an intermediate voltage in the range of 100–150 volts; and, a high speed DC to DC converter having an internal transformer coupling applying voltage across the output terminals and means for regulating the applied voltage to an output voltage in the range of 0–113 volts. The module is universal and several can be connected in parallel, in series or to switch networks to construct several welders or cutters.

3 Claims, 10 Drawing Sheets

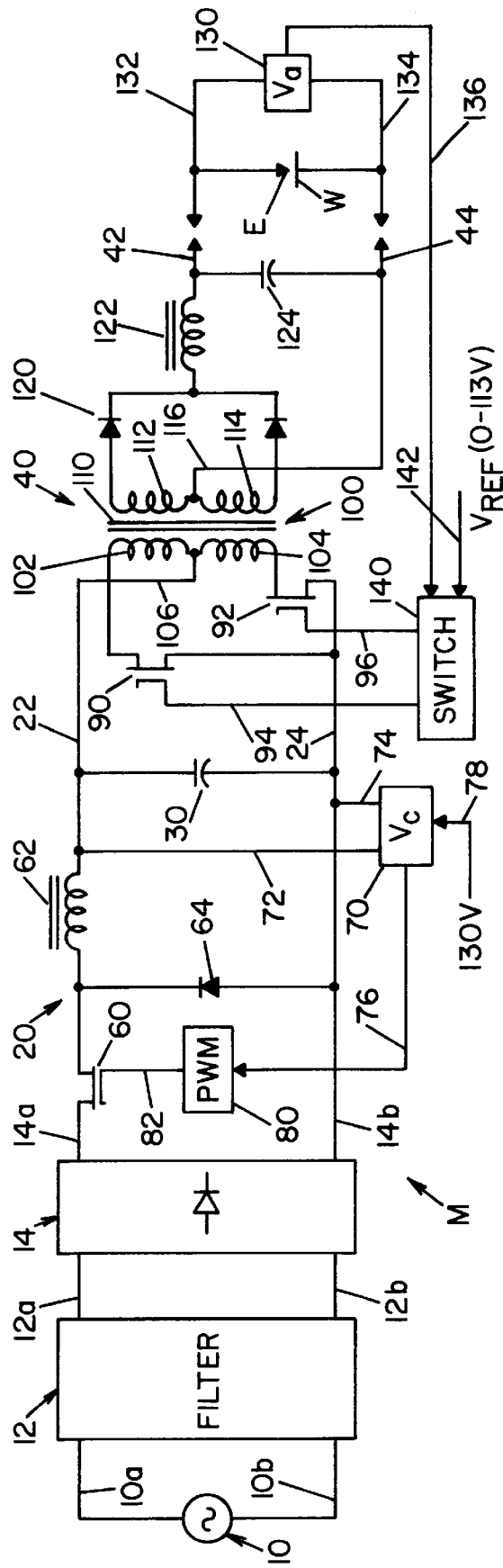
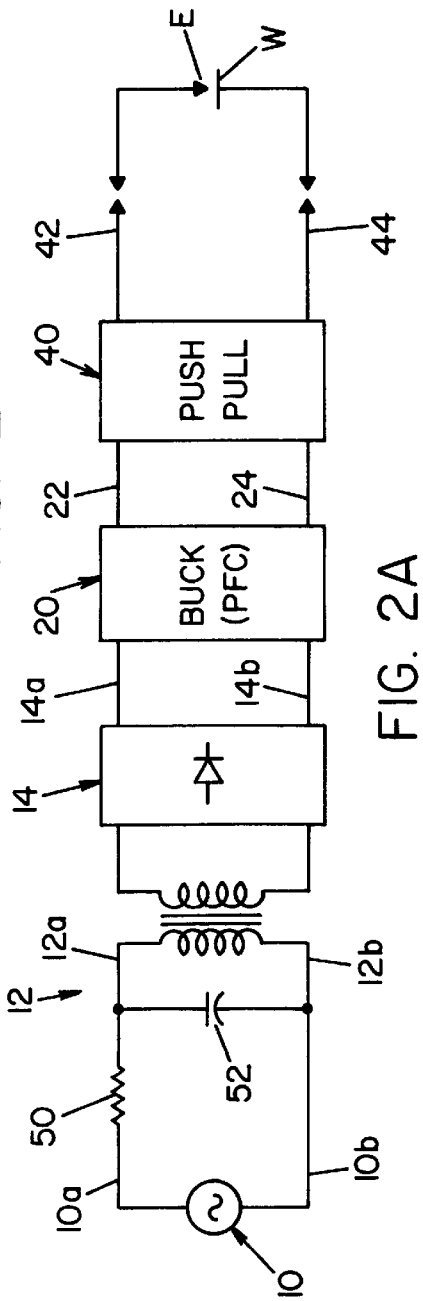
FIG. 2
FIG. 2A

ELECTRIC ARC WELDER AND PLASMA CUTTER

The present invention relates to the art of electric arc welding and plasma arc cutting and more particularly to a single phase power supply module used individually or in combination to provide an electric arc welder and/or in combination to construct a plasma arc cutter.

INCORPORATION BY REFERENCE

In accordance with the invention, a universal single phase module including a novel combination of circuits is combined in novel architectures to create a number of electric arc welders and/or plasma arc cutters having defined capacities. A novel combination of a specific power factor correcting circuit and a particular high speed DC to DC converter converts a single phase power source into a DC output voltage capable of use in electric arc welding and/or plasma arc cutting. A number of power factor correcting circuits are used with DC to DC converters or other types of power supplies for low quality low power applications. Such circuits and converters are well documented. For instance, an article by Peter N. Wood entitled *Fluorescent Ballast Design Using Passive P. F. C. and Crest Factor Control* by International Rectifier discloses passive and active power factor correcting circuits for use with lighting ballast. The active circuit is a boost converter and the primary passive circuit is a 50% valley fill circuit. These power factor correcting circuits are used in lighting systems using pulsating voltage which is not used in the invention; however, this article is incorporated by reference herein as background information. It does show common power factor correcting circuits, even though these circuits are not the type used in the present invention. In power supplies, especially low energy, pulsating supplies, power factor correction is usually accomplished by a boost converter at the output of the full wave rectifier. Such converter can be rapidly switched to cause the input current to track the line voltage at the input of the rectifier; however, boost converters require that output voltage of the converter be greater than the peak voltage of the input AC voltage. The present invention is a module which has a relatively low output voltage that must be combined to provide high voltage for plasma arc cutting; consequently, boost converters are not applicable to the invention. Patents showing boost converts as power factor correcting are Wilkinson U.S. Pat. No. 4,677,366; Sood U.S. Pat. No. 5,235,504; and, Choi U.S. Pat. No. 5,612,609, which patents are incorporated as background information.

The present invention relates to a universal module that is used for electric arc welding and/or plasma arc cutting, which module is powered by a single phase AC voltage and has an output with sufficient range to produce the necessary current and voltage for high energy applications. The only module construction to accomplish this objective is disclosed in a copending application by assignee, which application is not prior art, but is incorporated herein as Ser. No. 390,494, filed Mar. 16, 1998.

Items incorporated by reference herein are background information and do not teach the present invention, although the copending application incorporated by reference herein does teach a module using controlled high speed switching of a full bridge inverter to correct the power factor of the input power supply. The technologies incorporated by reference herein need not be repeated in a description of the present invention.

BACKGROUND OF INVENTION

With the increase in the industrial use of electric arc welders, there is a demand for welders having output voltages between a minimum of 0–20 volts DC and a maximum of 50–100 volts DC. The welders require output currents between 100 amps and 1000 amperes. Welders rated at certain voltages and currents were separately designed. Smaller welders were constructed differently than larger welders. Most electric arc welders utilize a power supply using the topography of a DC to DC converter. Such converters are controlled by a pulse width modulation operated at a high speed pulse rate, such as 10–20 kHz. Such inverters are specially designed for either high power output or low power output. A number of inverter designs were required for a manufacturer to offer a total line of welders, especially for industrial use. Since welder manufacturers had to offer a large number of different welders having different sizes and ratings, research and development, the engineering and inventory requirements are costly and require a tremendous number of technical employees. This costly situation has been acerbated by the advent of plasma arc cutters, which units must be offered by manufacturers of electric arc welders. Although plasma arc cutters require power supplies quite similar to electric arc welders, the operating points for plasma cutters involves substantially higher output voltages with drastically lower output currents. By adding plasma arc cutters to the product line with electric arc welders, still additional design activity, inventory and service cost has been experienced. Thus, a manufacturer of electric arc welders and plasma arc cutters have several different power supplies, each of which is dedicated to a size and mode of operation for a welder or a cutter. In summary, inventory, support personnel, design personnel, inventory and service demands on a manufacturer offering a full line of electric arc welders and plasma arc cutters is substantial. Thus, only large, well capitalized manufacturers can enter into and maintain a viable competitive position in the rapidly developing field of electric arc welders and plasma arc cutters. Even such manufacturers experience decreased profits due to the high cost of maintaining a full line of products.

THE PRESENT INVENTION

The costs and extreme capital requirements needed to offer a full line of electric arc welders and plasma arc cutters are overcome by the present invention, which invention relates to a particular designed single phase module and to construction of a large number of welders and cutters from the novel single phase module. An attempt to produce a universal module is disclosed in copending application Ser. No. 39,494 filed Mar. 16, 1998. This prior application suggests a universal module using a power factor correcting inverter stage, controlled by a standard chip, which inverter stage is combined with an output inverter. The input inverter stage utilized switching of four switches in a full wave bridge to produce power factor correction of the input source. Three phase implementation of the module uses the switching control chip for a three phase input to the module. Such arrangement is complex and does not allow the module designed for a three phase power source to be used with single phase power source.

Power factor correcting circuits are well known for use in lighting systems. These circuits can be passive, such as a valley fill circuit, or active, such as a boost converter circuit. Valley fill circuits have not been widely used in different electrical systems. Indeed, the basic power factor correcting circuit for lighting systems has been the boost converter circuit. This power factor correcting circuit is not applicable for a universal module to be used in electric arc welding and/or plasma arc cutting, since the output of the circuit must be greater than the peak input of the power source. Since a power supply must be capable of operating with an input the power source varies between 200 VAC and 600 VAC, a boost power factor correcting circuit is not applicable for use in the present invention. The output voltage circuit would need to be over 800 volts DC. Although a valley fill power factor correcting circuit may be applicable, it could only be used for extremely small welders and/or for plasma arc cutters. Use of a valley fill circuit could not be used for a wide range of welders and cutters, which is the basic objective of the present invention. Thus, the use of complicated power factor correcting circuits now available as integrated circuit chips and boost converter power factor correcting circuits are not applicable for welders and cutters requiring smooth output voltage.

The present invention is directed to a single phase module that is universal in application and may be connected in a variety of networks to produce a wide range of welders and a wide range of plasma arc cutters. By merely combining the module of the present invention into unique architectures, individual welders and cutter units with different ratings can be produced. The invention relates to the novel module and the use of this module in a variety of combinations and connections to create a wide range of welders and plasma arc cutters. The novel universal single phase module and the use of such a module for creating a large range of welders and cutters has heretofore not been suggested to solve the problem of the need for a great number of independent welders and cutters to provide a full line of products.

In accordance with the present invention, there is provided a single phase power supply module for electric arc welders and plasma arc cutters, which module comprises a single phase input stage, positive and negative output terminals, a full wave rectifier connected to the input stage for rectifying the single phase voltage at the input stage and a buck converter type power factor correcting circuit for controlling the current flow from the single phase input stage to the rectifier. In accordance with the invention, the buck converter has an output capacitor regulated to an intermediate voltage in the range of 100–150 volts. Preferably, the output regulated voltage of the power factor correcting circuit is approximately 130 volts DC. Thus, the module has a low THD and a high power factor for the single phase input. In accordance with the invention, a high speed DC to DC converter having an internal transformer coupling applies the voltage of the capacitor from the buck converter across the output terminals of the module and the applied voltage is regulated to an output voltage in a range of 0 to 113 volts. The output voltage of the single phase module is preferably between about 20–100 volts. This novel module has a load line in the broadest aspect with an open circuit voltage of 113 volts and, in a practical implementation, with an open circuit voltage of 90 volts. An intermediate voltage of about 130 volts on the output capacitor of the power factor correcting circuit provides a maximum non-conduction angle of 60°, which angle appears at the low voltage portion of the incoming voltage. Thus, distortion takes place at a low energy level. This maximum non-conduction of the incoming current occurs when the input voltage is approximately 200 VAC. At 570 VAC, the non-conduction portion is only approximately 10° and occurs at the zero crossing of the input voltage. Consequently, extremely low harmonics are created and little energy is consumed during non-conduction portions of the input current. The power factor is high and the harmonic distortion is low when using a module constructed in accordance with the present invention. The module accepts input voltages in the range of 200–600 VAC with a smooth output voltage below 113 volts.

Another aspect of the present invention is the use of an internal transformer coupling in the high speed DC to DC converter forming the output stage of the universal module constructed in accordance with the present invention. This converter is preferably a push pull inverter; however, it may be another galvanic isolated type inverter, such as a half bridge converter, a full bridge converter or a fly back converter.

By employing the buck converter as a power factor correcting circuit and a push pull converter to create the output voltage and current, the intermediate voltage of approximately 130 volts is lowered by the DC to DC converter to create the welding voltage. Thus, the stability, range and applicability of the universal module are increased. Since the module has an output voltage regulated by a pulse width modulator between 0–113 volts, the module itself is not used for plasma arc cutting. The module is used as a single phase electric arc welder having relatively low energy output. However, the basic use and advantage of the universal module is combination of the module to create a large range of welders and a large range of cutters. In accordance with an aspect of the invention, the novel module includes an input transformer for reducing the voltage of the single phase input source. By combining a buck converter to create the intermediate voltage of about 130 volts and an output converter with galvanic isolation, the welder and cutter manufacturer need only a single power supply to offer a large number of individual units with different ratings.

In accordance with another aspect of the present invention, there is provided a plurality of the novel universal modules constructed in accordance with the present invention, which plurality of modules are connected in parallel to form an electric arc welder. If the electric arc welder is to be connected to a three phase power source, three or six of the modules are employed and are connected in parallel. The output voltage is generally the voltage of the various modules and the current is increased according to the number of modules used in the combination. If the welder is to have an increased output rating from a single phase power source, several modules are connected to the same power source. In practice, three separate power supply modules are connected to a single phase source to balance energy draw by the welder. In a three phase welder, a multiple of three modules is preferred to maintain balance of the input three phase power source.

By using the universal single phase module of the present invention, a plasma arc cutter can be created by connecting the modules in series whereby the output voltage rating is increased and the output current is maintained at a low level. In practice, a plasma arc cutter requires a higher voltage than a single module constructed in accordance with the invention can develop. Thus, such plasma cutters generally involve the use of at least three modules connected in series. A three phase power source for use in a plasma arc cutter requires three or six universal modules connected in series. Indeed, on each phase, two modules could be connected in parallel and these pairs are then connected in series.

The use of a module constructed in accordance with the present invention allows production of welders or cutters with the desired rating. Consequently, the manufacturer inventories a single module and merely combines such modules into the desired architecture to produce a complete line of welders and cutters. The use of this concept to develop a total line of the product is novel and will substantially reduce the inventory, engineering cost, development activity, service efforts, related personnel and cost factors involving sale of a total line of welders and/or plasma arc cutters.

The primary object of the present invention is the provision of a single phase universal module that can be combined to produce a wide range of electric arc welders and/or plasma arc cutters to thereby create a range of welders and cutters without the need for different power supplies dedicated to each welder or cutter.

Another object of the present invention is the provision of a module, as defined above, which module includes a buck converter type power factor correcting circuit with an intermediate voltage in the range of 100–150 volts and an output converter with an internal transformer and energized by the intermediate voltage to produce an output voltage of less than 113 volts.

Another object of the present invention is the provision of a universal single phase module, as defined above, which module utilizes a buck converter with an output voltage in the range of 100–150 volts to minimize the THD and maximize the power factor of the module.

Yet another object of the present invention is the provision of a universal single phase power supply module, as defined above, which module can be connected in series and/or in parallel to create a power supply for electric arc welders and plasma arc cutters, respectively, which welders and cutters constitute a wide product line with a single module design.

Still a further object of the present invention is the provision of a universal single phase module, as defined above, which module is economical to produce and can be used in a wide range of welders and cutters and requires a minimum inventory of power supplies for constructing a full line of electric arc welders and plasma arc cutters.

These and other objects and advantages will become apparent from the following description.

BRIEF DESCRIPTION OF DRAWINGS

FIG. 2 is a combined block diagram and wiring diagram showing, in more detail, the preferred embodiment as illustrated in FIG. 1;

FIG. 2A is a schematic block diagram, combined with a wiring diagram, showing a modification of the preferred embodiment of the present invention;

PREFERRED EMBODIMENTS

Figure 1:
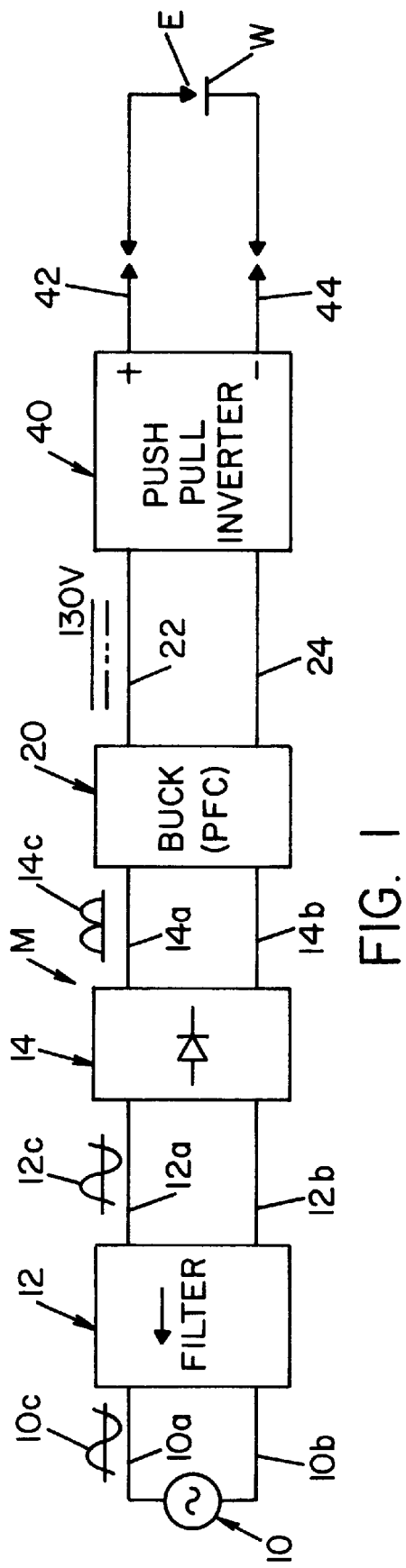
FIG. 1 is a schematic block diagram showing the preferred embodiment of the present invention with applicable wave forms superimposed thereon.
Figure 1A:
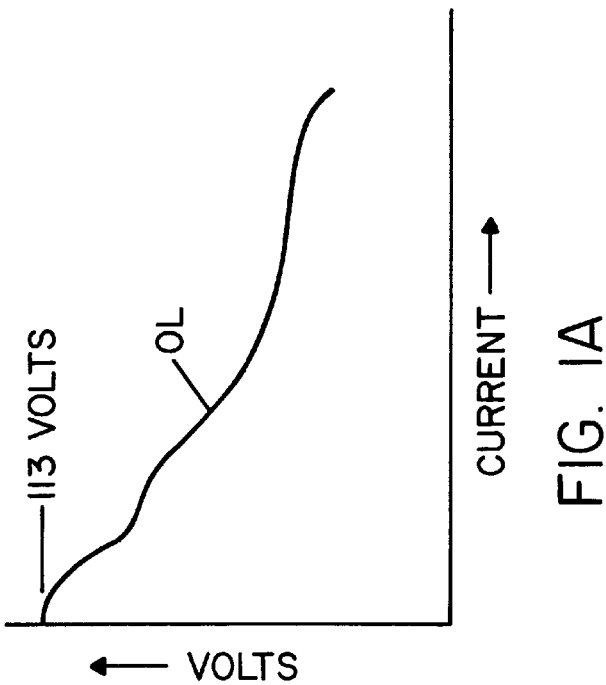
FIG. 1A is a graph showing the load line for the preferred embodiment of the present invention as illustrated in FIG. 1.
Figure 3:
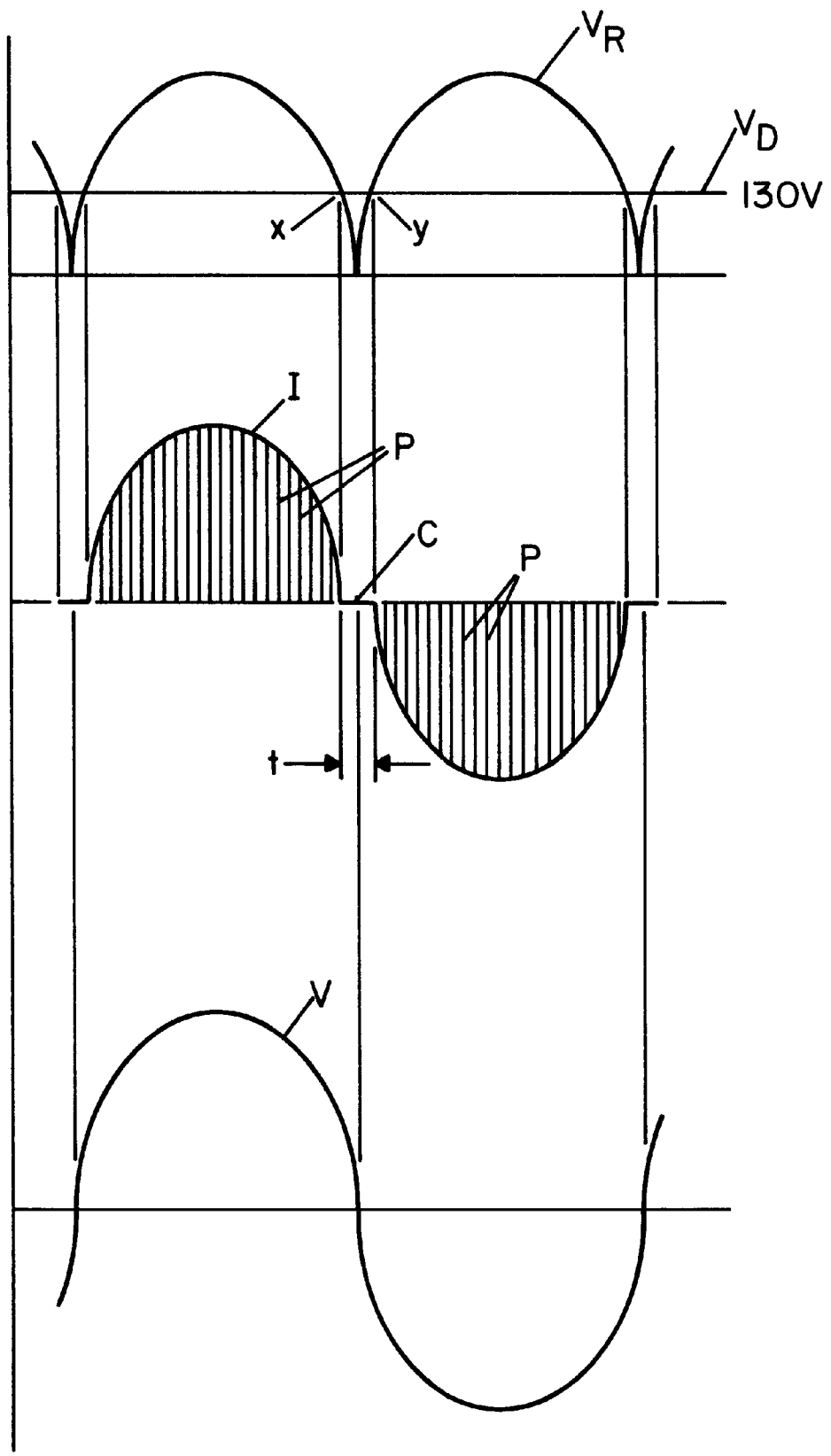
FIG. 3 is a graph showing voltage and current curves at the rectifier used in the preferred embodiment of the present invention.
Figure 6:
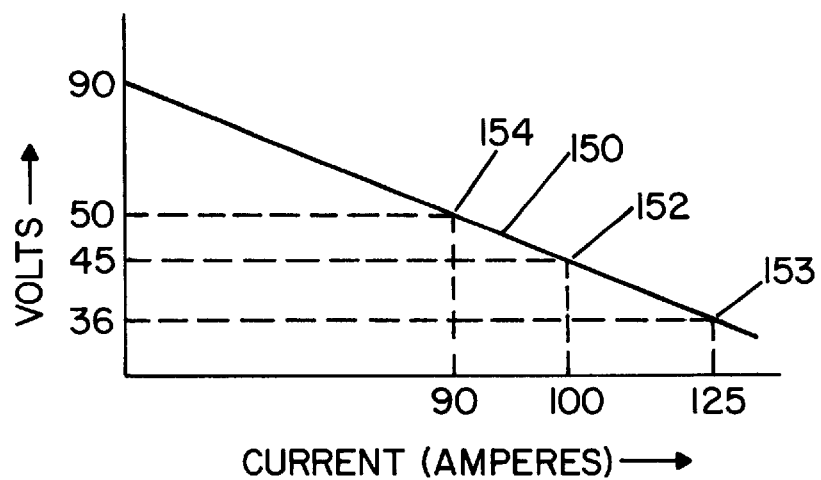
FIG. 6 is a graph showing the load line for the preferred embodiment of the present invention with a first operating point at 45 volts and 100 amperes and a second operating point at 50 volts and 90 amperes; and a third operating point at 36 volts and 125 amperes.

Referring now to the drawings wherein the showings are for the purpose of illustrating the preferred embodiments of the invention only and not for the purpose of limiting same, FIGS. 1 and 2 show a universal module M constructed in accordance with the invention. Module M is driven by a single phase power source 10 which may be one phase of a three phase source. Leads 10a, 10b have a wave form 10c which is directed to a standard filter 12 having output leads 12a, 12b and a wave form 12c with high frequency deviations or noise extracted. The filtered wave form 12c is directed to a full wave rectifier 14 having output leads 14a, 14b and an output wave form 14c. This wave form has a peak voltage determined by the peak voltage of the single phase power source 10. In accordance with the invention, a buck converter 20 is used as a power factor correcting circuit (PFC) to create an intermediate voltage in the range of 100–150, volts, preferably 130 volts, across output storage capacitor 30, as shown in FIG. 2. Voltage across capacitor 30 is directed by leads 22, 24 to the input side of a push pull DC to DC converter 40 having a positive terminal 42 forming the positive stud or output terminal of module M and a negative output terminal 44 forming the negative stud or output terminal for module M. As shown in FIGS. 1 and 2, module M is used as an electric arc welder with the voltage across output terminals 42, 44 being applied across electrode E and workpiece W. Converter 40 reduces the intermediate voltage across leads 22, 24 to a DC welding voltage, which is normally in the range of 20–100 volts and is always below about 113 volts. As shown in FIG. 2A, filter 12 includes an resistor 50 and a capacitor 52 to remove high frequency noise from input voltage V. FIG. 2 illustrates details of the preferred embodiment of the invention, wherein buck converter 20 includes a single switch 60 in the form of a IGBT for directing current to inductor 62 that provides energy to storage capacitor 30. Free wheeling diode 64 is connected in parallel with capacitor 30 to provide energy to inductor 62 between current pulses from switch 60. The intermediate voltage at capacitor 30 is controlled by voltage sensor 70 measuring the voltage between leads 22, 24 by input leads 72, 74, respectively. A voltage command signal in line 76 is generated by sensor 70 based on a comparison of the measured input between leads 22 and 24 with a reference signal in line 78 having a magnitude to control voltage on capacitor 30 at an intermediate level in the range of 100–150 volts, i.e. preferably 130 volts. Switch 60 is a high speed switch operated by a standard pulse width modulator 80 operated at a high frequency preferably in the range of 60–120 kHz with a duty cycle to give an energy transfer in accordance with the magnitude of the signal on line 76. The switching speed is somewhat dependent upon the rating of the switch 60. Switching signal in line 82 causes switch 60 to conduct current from rectifier 14 in short current pulses at high frequency with the duty cycle of the pulses controlling the voltage across capacitor 30. Buck converter 20 is used in the module M in accordance with the invention. Such converter is an active power factor correcting circuit which causes current I of input source 10 to flow when the switch is on and the output voltage $V_R$ of rectifier 14 is greater than the output voltage $V_D$ appearing as the intermediate voltage on capacitor 30 as shown in FIG. 3. The buck converter is used in combination with a galvanic isolated DC to DC converter 40 which, in the primary aspect of the invention, is a push pull converter as shown in FIG. 2. This converter has switches 90, 92, in the form of IGBTs, connected with common collectors and having base control leads 94, 96. Internal transformer coupling in the push pull converter is performed by transformer 100 with primary winding sections 102, 104 divided by center tap 106. Core 110 causes the opposite pulses in sections 102, 104 to induce voltage in secondary winding sections 112, 114 separated by center tap 116. Rectifier 120 rectifies the voltage in the secondary windings and directs current flow through filter inductor 122 to create a voltage across capacitor 124. Arc voltage $V_a$ is monitored by sensor 130 in response to the voltage across leads 132, 134 connected across electrode E and workpiece W. A voltage command signal in line 136 is directed to the input of switch control 140 to create switching signals in lines 94, 96 causing conduction of switches 90, 92 in accordance with the logic on lines 94, 96. The switches are operated at a high speed, preferably in the range of 60–120 kHz. Again the speed is dependent upon the rating of switches 90, 92. In the preferred embodiment this switching speed is at least about 20 kHz. A reference signal on line 142 is set to a desired voltage $V_{REF}$ in the range of 0–113 volts, so the signals in lines 94, 96 maintain the desired voltage across electrode E and workpiece W in accordance with standard welding control technology. By constructing module M using a combination of a buck converter with a controlled output voltage in the range of 100–150 volts and a push pull DC to DC converter with an output voltage in the range of 0–113 volts, a unique power supply module is realized having low harmonics, high power factor and capability of providing an output voltage with an operating line generally illustrated in FIG. 1A. Load line OL extends from 113 volts open circuit voltage to a low voltage generally in the range of about 20 volts. The actual operating line 150 for the preferred embodiment is illustrated in FIG. 6 with an open circuit voltage of 90 volts and a first operating point 152 at 45 volts at 100 amperes a second operating point 154 at 50 volts and 90 amperes and a third operating point 153 at 36 volts and 125 amperes.

Figure 4A:
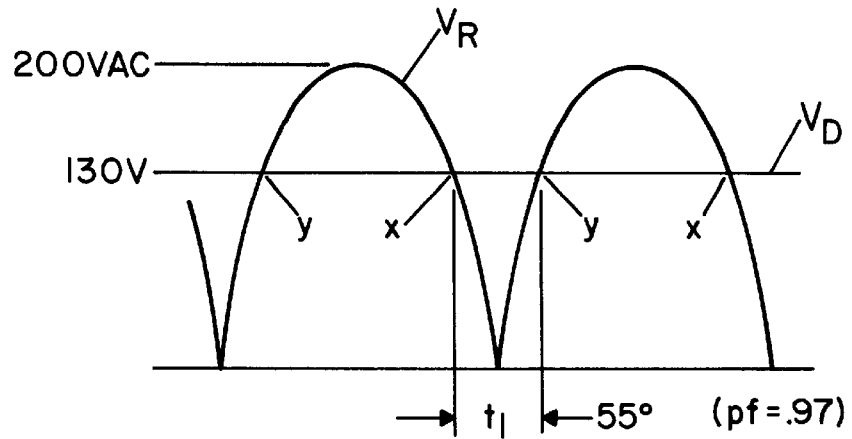
FIG. 4A is a graph illustrating the relationship between the input voltage and intermediate voltage of the preferred embodiment of the present invention, with a minimum input voltage of 200 VAC.
Figure 4B:
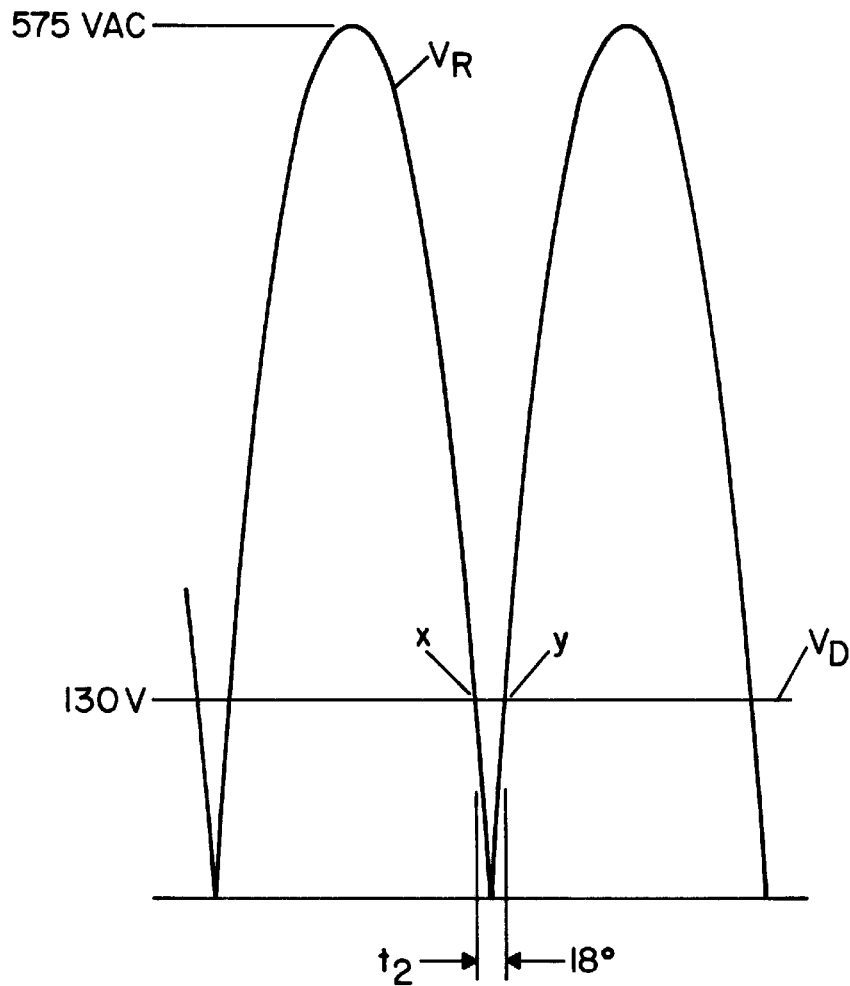
FIG. 4B is a graph similar to FIG. 4A illustrating the operation of the present invention with a maximum input voltage of 575 VAC.
Figure 5A:
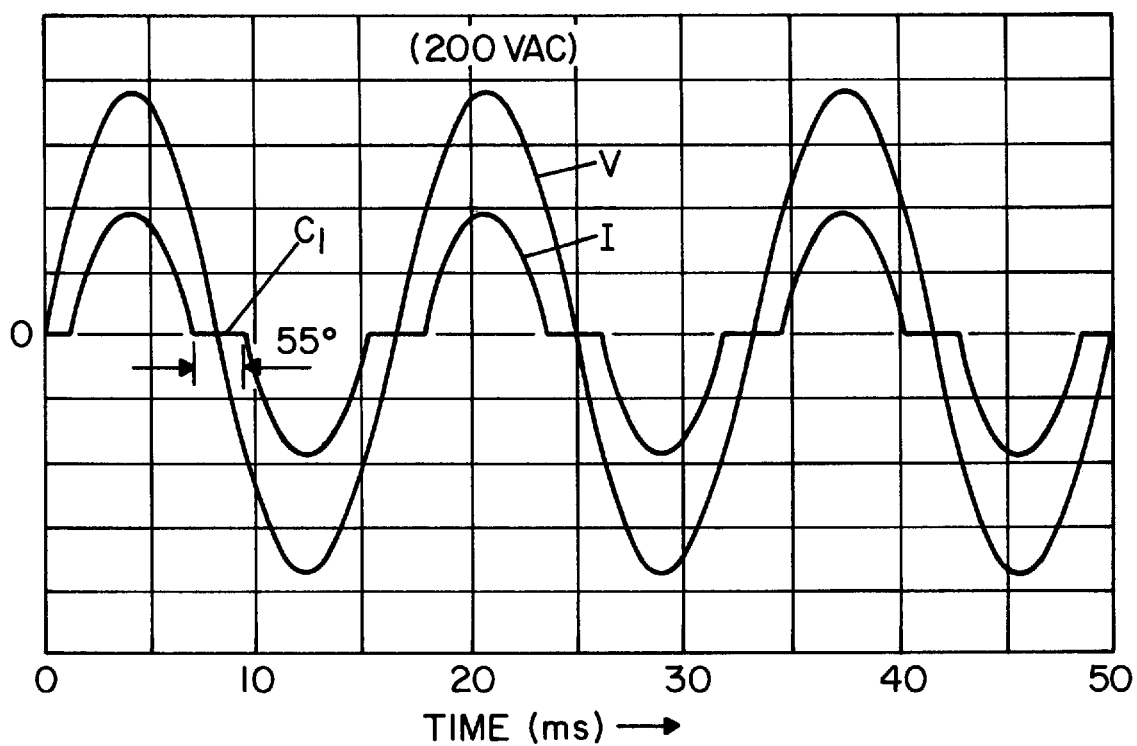
FIG. 5A is a graph of input voltage and current for a minimum input voltage.
Figure 5B:
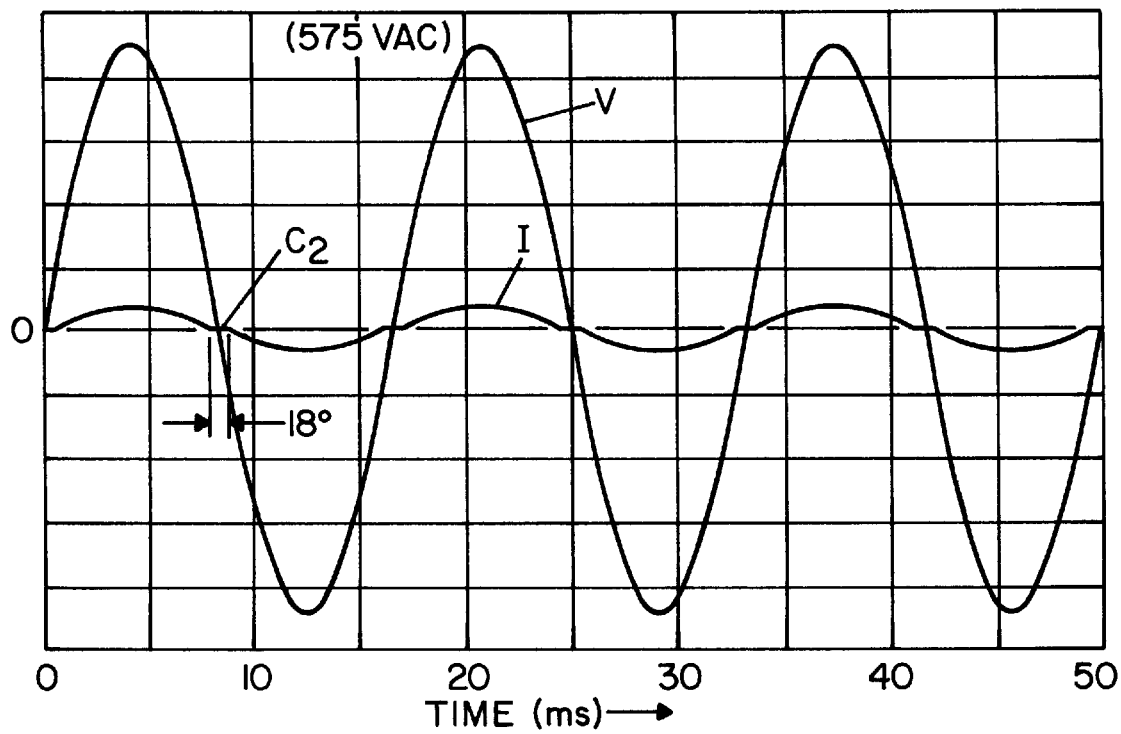
FIG. 5B is a graph similar to FIG. 5A for a maximum input voltage.

By using a preferred intermediate voltage $V_D$, shown in FIG. 3 as 130 volts, the single phase input voltage V in its rectified form $V_R$ allows input current I to have a relatively small period C of non-conduction with a time t. Switch 60 of buck converter 20 operates rapidly to create current pulses P as shown in the center graph of FIG. 3. Due to the rapid formation of the pulses P, input current I flows at times when voltage $V_R$ is greater than voltage $V_D$ and when switch 60 is conducting. This produces a wave form for the input current with a very small period C of non-conduction. This causes a minimum THD and a high power factor. Incoming voltage V from power source 10 will vary between 200–600 VAC resulting in peak voltage in the range of 280–850 volts. The maximum time of non-conduction is illustrated in FIG. 4A where rectified voltage $V_R$ intersects the voltage $V_D$ of capacitor 30 at intersection points x, y. For illustration, the scale of $V_R$ is reduced. The time $t_1$ between points x and y, in this worst case situation, is 55° to give a power factor of 0.97. As the input voltage V increases, the peaks of rectified voltage $V_R$ drastically increase as illustrated schematically in FIG. 4B representing an input voltage of 575 VAC. The spacing between intersection points x, y at 575 VAC is the approximately 18° shown as time $t_2$. The non-conduction period of current from source 10 is relatively small and occurs at low energy levels when voltage $V_R$ is near zero. The relationship as shown in FIGS. 4A, 4B is also illustrated in FIGS. 5A, 5B where the non-conduction period $C_1$ of current I is 55° for 200 VAC and non-conduction period $C_2$ is 18° for 575 VAC input voltage V. The graphs shown in FIGS. 5A, 5B are actual graphs illustrating the operation of the present invention as shown in FIG. 2.

Figure 7:
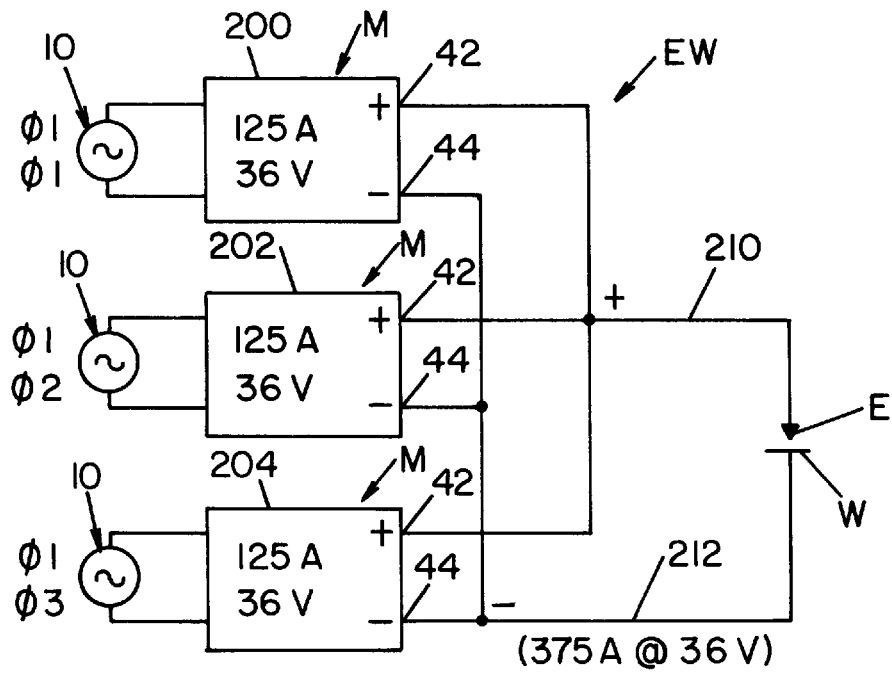
FIG. 7 is a block diagram showing a preferred embodiment of the present invention wherein single phase modules of the invention are connected in parallel to create an electric arc welder operating at 36 volts and 375 amperes.
Figure 8:
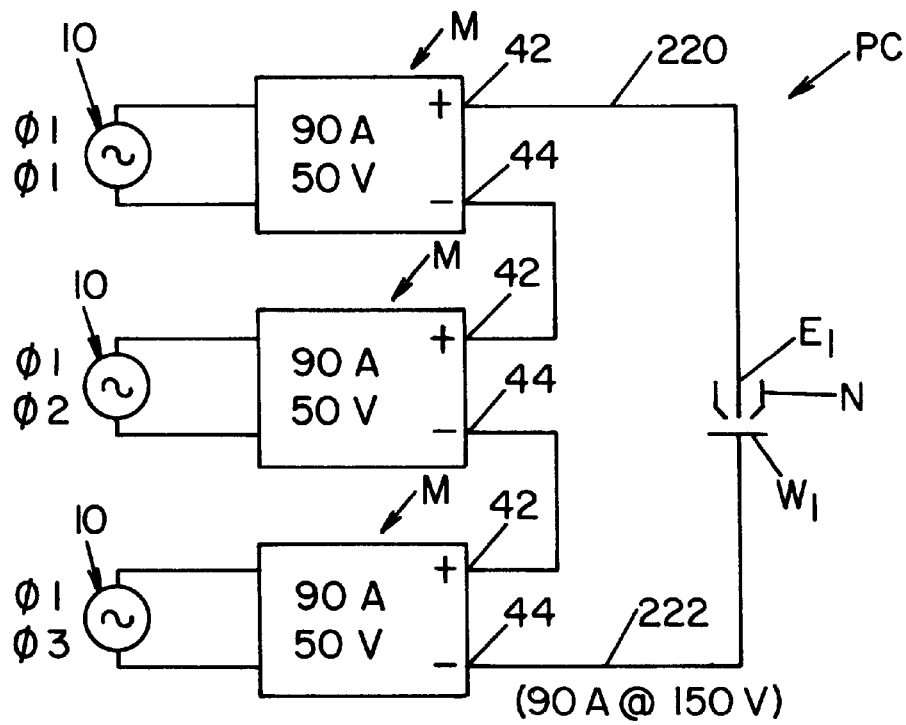
FIG. 8 is a view similar to FIG. 7 wherein the modules constructed in accordance with the present invention are connected in series to create a plasma arc cutter operating at 150 volts and 90 amperes.

Single phase universal module M has the advantage that it can be used to construct different welders or plasma arc cutters to be sold as a completed unit. To illustrate this aspect of the invention, module M is designed to have a load line 150 as shown in FIG. 6. An operating point 153 is established when modules M are to be used to construct an electric arc welder EW, as shown in FIG. 7. Operating point 153 has a voltage of 36 volts DC and a current of 125 amperes. Three modules 200, 202 and 204 are connected in parallel to create welding terminals or studs 210, 212 from the three module terminals 42, 44. Source 10 of modules 200, 202 and 204 are each a single phase, which phase may be the same electrical phase or one of three separate electrical phases in a three phase power source. By connecting modules M as shown in FIG. 7, welder EW is created for directing current between electrode E and workpiece W connected to output terminals or studs 210, 212. The output voltage of welder EW is the voltage of the individual modules and the current is the sum of the 10 currents from the individual modules. By connecting additional modules the rating of welder EW can be increased. Operating point 154 of load line 150 in FIG. 6 is obtained when modules M are joined into a configuration or architecture for constructing a plasma arc cutter, such as cutter PC shown in FIG. 8. Operating point 154 has a voltage of 50 volts and a current of 90 amperes. By connecting output terminals 42, 44 in series, cutting terminals 220, 222 are established for plasma cutter PC to provide current between electrode $E_1$ and workpiece $W_1$ through nozzle N. As in FIG. 7, single phase source 10 can be the same single phase or one of three separate phases in a three phase power source. Cutter PC is operated at a high voltage indicated to be 150 volts DC, which voltage is the summation of the voltages available from the three separate modules M. Current for cutter PC is the current at operating point 154, i.e. 90 amperes. Output cutter terminals 220, 222 are connected across electrode E₁ and workpiece W₁ to nozzle N forming a plasma cutting operation. If additional voltage is required, another module M is connected in series. It is preferred to use three modules for a welder as shown in FIG. 7 or a plasma arc cutter as shown in FIG. 8, especially when the incoming power is a three phase source. Multiples of three modules M can be connected to a three phase source. In addition, several modules M can be used for welding and plasma arc cutting when using a single phase input by combining the modules as illustrated in FIGS. 7 and 8.

Figure 9:
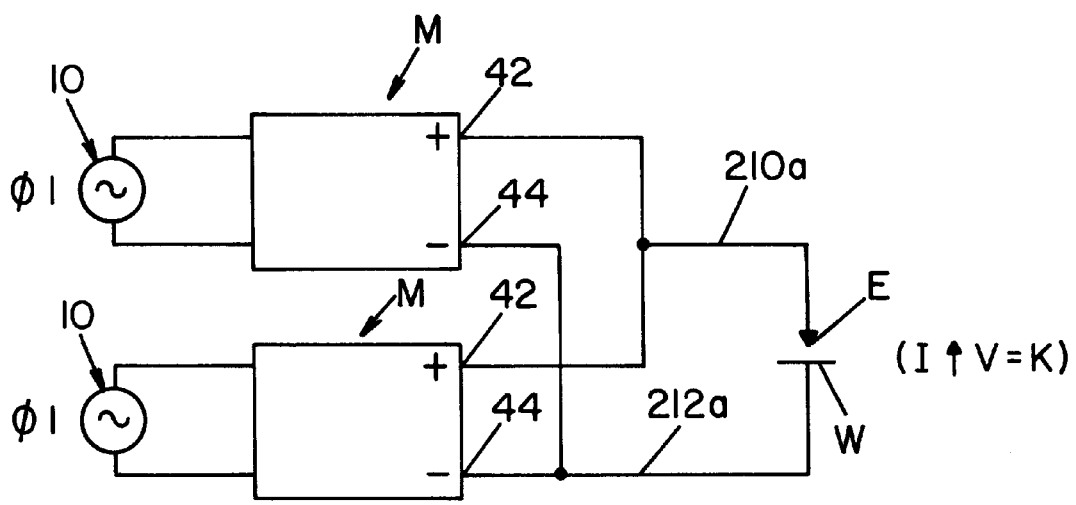
FIG. 9 is a block diagram showing two single phase modules connected in parallel to create an electric arc welder.
Figure 10:
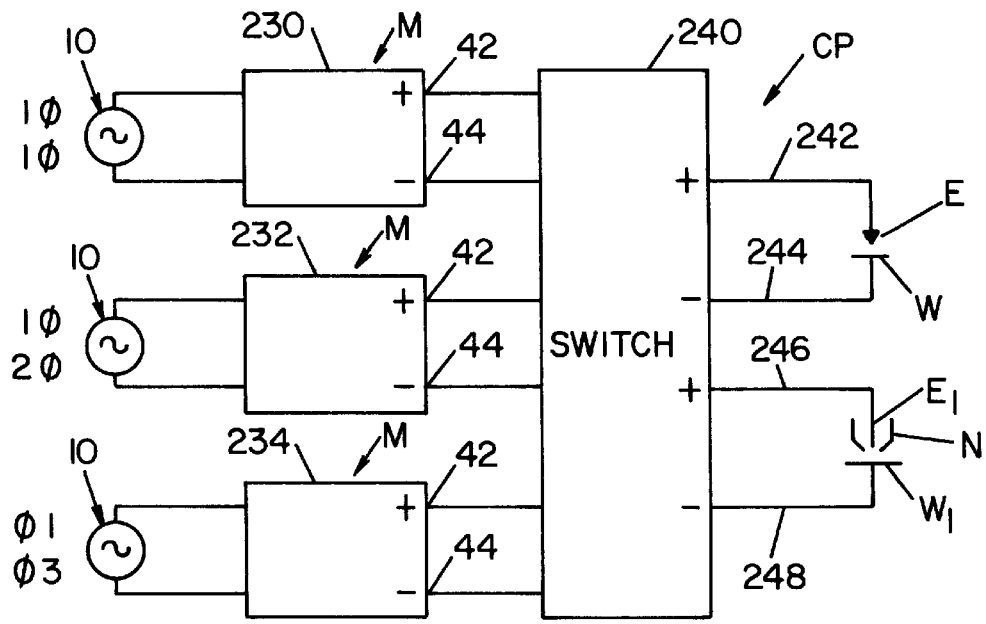
FIG. 10 is a further implementation of the present invention wherein three single phase universal modules constructed in accordance with the invention are connected to a switching circuit for selectively connecting the modules in parallel or in series to create a welder or plasma cutter, respectively.

For some welders, it is not necessary to use three modules M. This concept is illustrated in FIG. 9 wherein two modules are each connected to a single phase 10 and are also connected in parallel to form welding terminals 210a, 212a. In this instance, operating point 153 would produce a voltage of 36 volts DC and a current of 250 amperes. By changing the number of modules M used in constructing a welder, welders having different ratings are constructed without requirement of a large inventory of different welders. Another aspect of the invention is illustrated in FIG. 10 wherein three modules M, i.e. modules 230, 232 and 234, are connected to switching network 240. Switching network 240 selectively connects terminals 42, 44 in parallel to provide welding terminals 242, 244, or in series to provide cutting terminals 246, 248. The number of modules M connected to switching network 240 can be changed to adjust the rating of the welder and/or plasma arc cutter. Combined power supply CP of FIG. 10 can be used for single phase operation or three phase operation as indicated.

Figure 11:
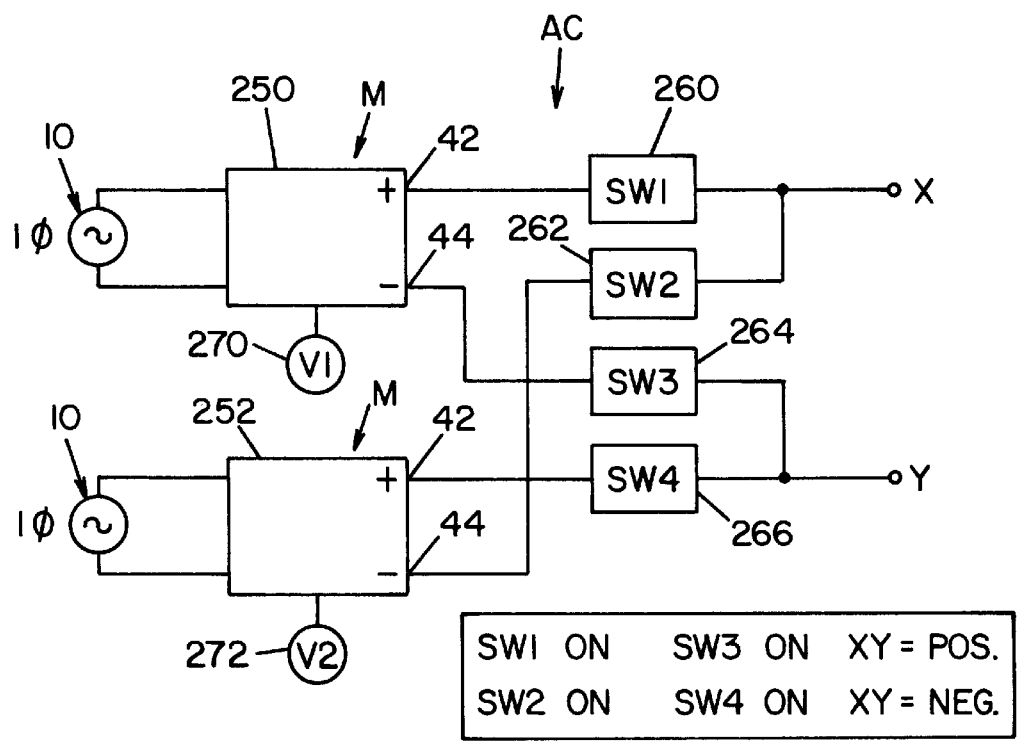
FIG. 11 is another implementation of the present invention wherein two universal modules are connected to a switching network for creating an AC welder with adjustable voltages for each polarity and capable of producing unbalanced welding, such as used in TIG welding.

Another use of modules M is illustrated in FIG. 11 wherein an alternating current welder AC includes modules 250, 252. Terminals 42, 44 of the separate modules form the input sides of switches 260, 262, 264 and 266. Switches 260, 262 are connected to positive terminal 42 of module 250 and negative terminal 44 of module 252. The output of these switches is connected to terminal X of welder AC. In a like manner, switches 264, 266 connect the negative terminal 44 of module 250 and the positive terminal 42 of module 252 to terminal Y of welder AC. By closing switch 260 and switch 264, the voltage across terminals X, Y is positive. By closing switch 262 and switch 266, the reverse polarity is across terminals X, Y. By rapidly switching between the two states, the voltage at terminals X, Y is an alternating current. When using welder AC, each module M is individually adjusted to a desired voltage, as indicated by voltage V1 at control 270 and voltage V2 at control 272. In a like manner, the time between the straight polarity and the reverse polarity can be adjusted to produce an unbalanced AC welder of the type used for TIG welding of aluminum and similar material. Welder AC could employ additional modules M to increase the current available for welding with alternating current. This welder could also be used for either straight DC welding or reverse DC welding.

Figure 12:
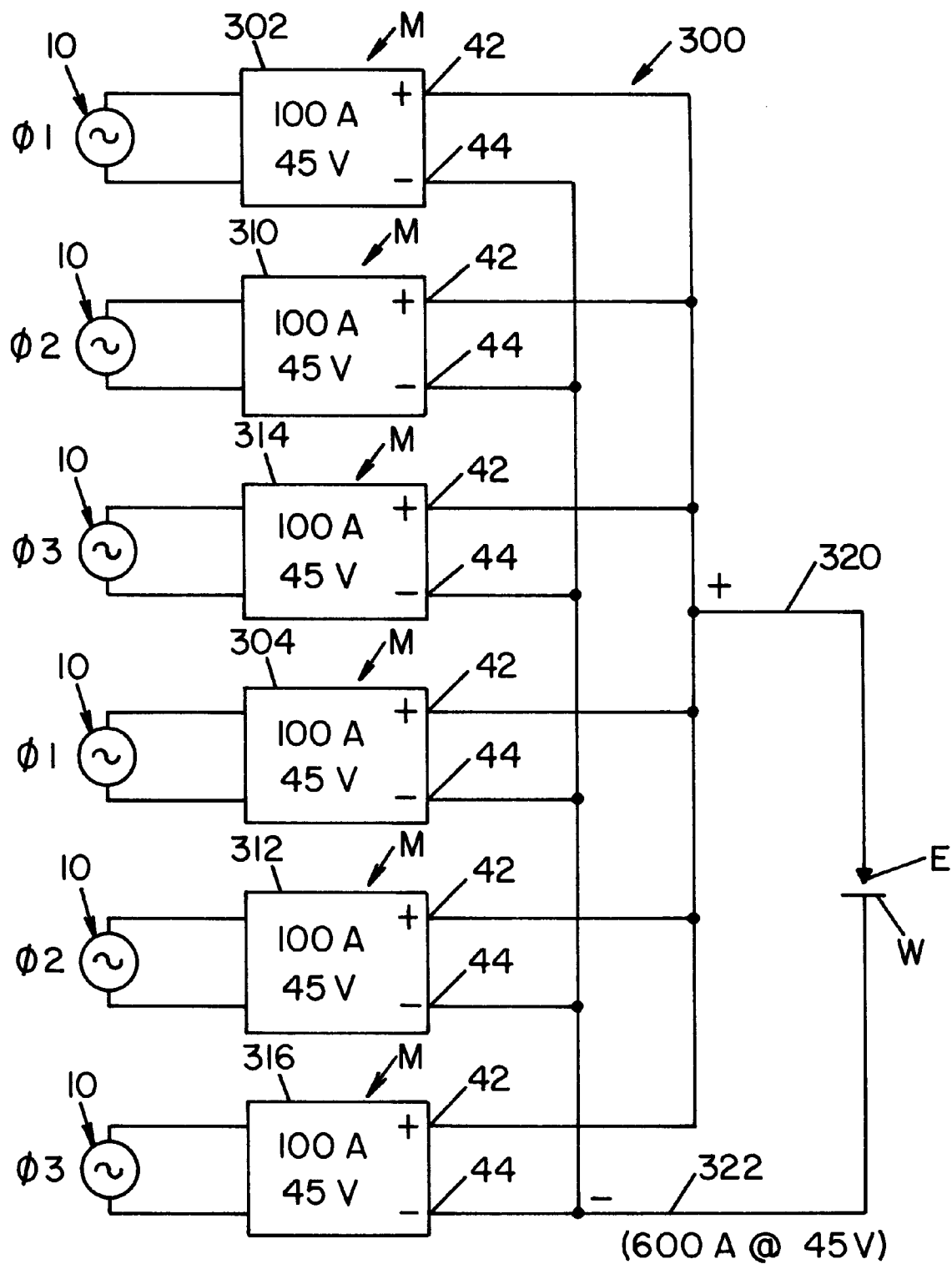
FIG. 12 is a block diagram illustrating the use of the universal module of the present invention connected to a three phase power source, with two modules used for each phase and connected in parallel to create the electric arc welder having a substantially high power rating; and, FIG. 13 is a block diagram showing single phase universal modules constructed in accordance with the invention with a single phase input and a plurality of modules connected in parallel to create a relatively high capacity electric arc welder.
Figure 13:
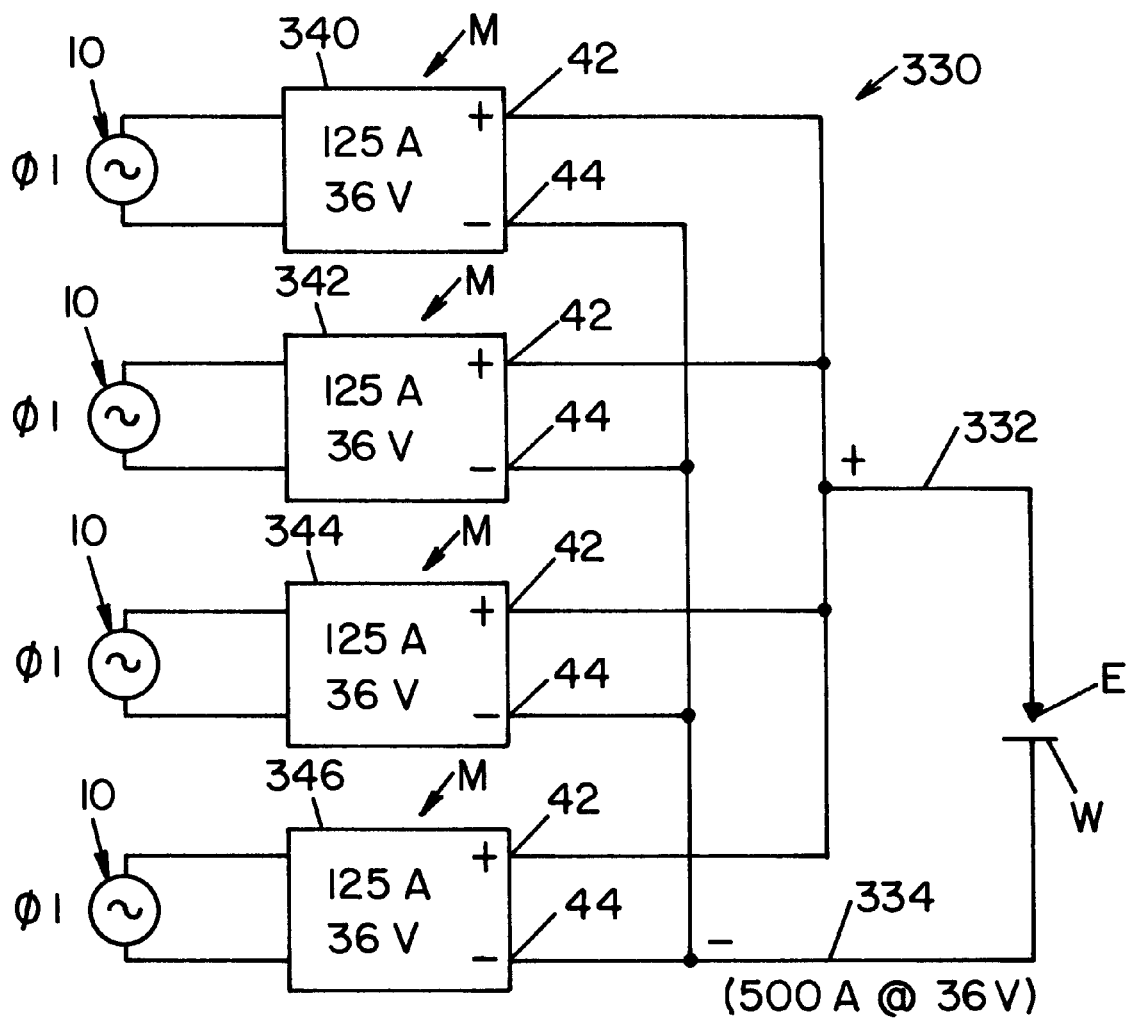

The versatility of using modules M is further illustrated by the construction of welder 300 shown in FIG. 12. Modules 302, 304 are connected to phase φ1. Modules 310, 312 are connected to phase φ2 and modules 314, 316 are connected to phase φ3. The six modules are arranged in a parallel network to establish welding terminals 320, 322 for forming welder 300 with a capacity of 600 amps at 45 volts DC when modules M are operated in accordance with point 152, as shown in FIG. 6. A similar architecture for a single phase power source is illustrated in FIG. 13 wherein welder 330 has welding terminals 332, 334 powered by modules 340, 342, 344 and 346 connected in parallel. Welder 330 produces 500 amperes at 36 volts DC when the modules are constructed to operate on point 153 as shown in FIG. 6.

FIGS. 6–13 show representative architecture for interconnecting a plurality of modules M to produce a welder having a particular capacity or a plasma arc cutter having a particular capacity. By using switching technology, various combinations used in constructing commercial welders and plasma arc cutters can use modules M. The modules have a high power factor, minimum harmonic distortion with incoming single phase voltage in the range of 200–600 VAC. By using a combination of a buck converter for power factor correcting and a switching type output converter having galvanic isolation, the module can reduce the intermediate voltage selected at 130 volts to a low voltage of less than about 113 volts in a very efficient manner to provide the necessary current and voltage range for high powered welders and plasma arc cutters. A variety of other combinations of the universal module M can be implemented without departing from the present invention.

Having thus defined the invention, the following is claimed:

1. An AC welder including first and second single phase power supply modules, each of said modules comprising: a single phase input stage; positive and negative output terminals; a full wave rectifier connected to said input stage for rectifying the single phase voltage at said input stage; a buck converter type power factor correcting circuit for controlling current flow from said input stage to said rectifier, said buck converter having an output capacitor regulated to an intermediate voltage in the range of 100–150 volts; and, a high speed DC to DC converter having an internal transformer coupling applying voltage across said output terminals and means for regulating said applied voltage to an output voltage in the range of 0–113 volts, said welder having first and second output studs, first switch means for connecting said positive terminal of said first module to said first stud and said negative terminal of said first module to said second stud, second switch means for connecting said negative terminal of said second module to said first stud and said positive terminal of said second module to said second stud and control means for alternately activating said first and second switch means for periods one and two, respectively.

2. An AC welder as defined in claim 1 wherein said period one and two are different times.

3. An AC welder as defined in claim 1 wherein the output voltage of said modules are different.

* * * * *